United States Patent
Weatherhead et al.

(10) Patent No.: US 12,475,173 B2
(45) Date of Patent: Nov. 18, 2025

(54) SYSTEMS AND METHODS FOR ANALYZING METADATA

(71) Applicant: Sensia LLC, Houston, TX (US)

(72) Inventors: Norman Andrew Weatherhead, Kitchener (CA); Edward Anthony Gray, Olmstead Township, OH (US); Jeffery P. Anderson, Beaumont (CA); Michael John Ross Brown, Calgary (CA); Shelby Adam Murrell, Dripping Springs, TX (US)

(73) Assignee: Sensia LLC, Houston, TX (US)

( * ) Notice: Subject to any disclaimer, the term of this patent is extended or adjusted under 35 U.S.C. 154(b) by 0 days.

(21) Appl. No.: 17/378,509

(22) Filed: Jul. 16, 2021

(65) Prior Publication Data

US 2022/0019620 A1 Jan. 20, 2022

Related U.S. Application Data

(60) Provisional application No. 63/053,441, filed on Jul. 17, 2020.

(51) Int. Cl.
*G06F 16/907* (2019.01)
*E21B 47/12* (2012.01)
*G06F 16/9032* (2019.01)

(52) U.S. Cl.
CPC ............ *G06F 16/907* (2019.01); *E21B 47/12* (2013.01); *G06F 16/90328* (2019.01)

(58) Field of Classification Search
CPC .. G06F 16/907; G06F 16/90328; G06F 16/36; G06F 16/2465; E21B 47/12; E21B 2200/22
See application file for complete search history.

(56) References Cited

U.S. PATENT DOCUMENTS

| | | | |
|---|---|---|---|
| 9,271,110 B1 | 2/2016 | Fultz et al. | |
| 11,825,308 B2 | 11/2023 | Weatherhead | |
| 11,868,754 B2 | 1/2024 | Anderson | |
| 2003/0074139 A1* | 4/2003 | Poedjono | G01V 1/44 |
| | | | 702/16 |
| 2006/0130037 A1 | 6/2006 | Mackay | |
| 2008/0209414 A1 | 8/2008 | Stein | |
| 2009/0062929 A1 | 3/2009 | Takahashi | |
| 2011/0107322 A1 | 5/2011 | Hashiguchi | |
| 2012/0075059 A1 | 3/2012 | Fyke et al. | |

(Continued)

*Primary Examiner* — Albert M Phillips, III
*Assistant Examiner* — Fernando M Mari Valcarcel
(74) *Attorney, Agent, or Firm* — Foley & Lardner LLP

(57) ABSTRACT

A control system for aggregating metadata at hydrocarbon site is shown. The control system includes one or more edge devices. At least one of the one or more edge devices includes a processing circuit configured to receive sensor data from a plurality of sensors and integrate the received sensor data into a set of metadata, the set of metadata including stored operational data of the hydrocarbon site. The processing circuit is configured to aggregate the set of metadata according to one or more criteria, the one or more criteria configured to categorize the received sensor data. The processing circuit is configured to identify one or more connected devices based on the aggregated set of metadata and the one or more criteria and adjust operation of the one or more edge devices based on the aggregated set of metadata.

20 Claims, 9 Drawing Sheets

(56) References Cited

U.S. PATENT DOCUMENTS

| | | |
|---|---|---|
| 2013/0024542 A1 | 1/2013 | Keller et al. |
| 2013/0252583 A1 | 9/2013 | Brown et al. |
| 2014/0375422 A1 | 12/2014 | Huber et al. |
| 2017/0154484 A1 | 6/2017 | Pluss et al. |
| 2017/0293896 A1 | 10/2017 | Katayama et al. |
| 2017/0311368 A1* | 10/2017 | Kandur Raja ...... H04L 41/0859 |
| 2018/0239991 A1* | 8/2018 | Weller .................. G06F 16/907 |
| 2018/0373781 A1* | 12/2018 | Palrecha ................. G06F 9/547 |
| 2018/0375953 A1* | 12/2018 | Casassa Mont .... H04L 61/5014 |
| 2019/0034735 A1* | 1/2019 | Cuban ....................... G06T 7/20 |
| 2019/0052638 A1 | 2/2019 | Agarwal et al. |
| 2019/0244129 A1* | 8/2019 | Tabuchi ................ G06F 9/5033 |
| 2019/0310928 A1* | 10/2019 | Hess .................. G05B 19/4185 |
| 2019/0347121 A1 | 11/2019 | Luo et al. |
| 2020/0182036 A1* | 6/2020 | Rangarajan ............ G06N 20/00 |
| 2021/0136580 A1 | 5/2021 | Bjelcevic |
| 2021/0144517 A1 | 5/2021 | Guim Bernat et al. |
| 2021/0409478 A1 | 12/2021 | Choi et al. |
| 2022/0018231 A1 | 1/2022 | Weatherhead et al. |

\* cited by examiner

SYSTEMS AND METHODS FOR ANALYZING METADATA

CROSS-REFERENCE TO RELATED APPLICATIONS

This application claims priority from U.S. Provisional Application No. 63/053,441, filed Jul. 17, 2020, which is incorporated herein by reference in its entirety.

BACKGROUND

The present disclosure relates generally to control systems. More particularly, the present disclosure relates to analyzing metadata to optimize to improve control schemes including but not limited to control schemes using edge devices in industrial systems, such as gas and oil extraction stations.

SUMMARY

One implementation of the present disclosure is a control system for aggregating metadata at hydrocarbon site, according to some embodiments. The control system includes one or more edge devices, wherein at least one of the one or more edge devices includes a processing circuit. The processing circuit is configured to receive sensor data from a plurality of sensors. The processing circuit is configured to integrate the received sensor data into a set of metadata, the set of metadata including stored operational data of the hydrocarbon site. The processing circuit is configured to aggregate the set of metadata according to one or more criteria, the one or more criteria configured to categorize the received sensor data. The processing circuit is configured to identify one or more connected devices based on the aggregated set of metadata and the one or more criteria and adjust operation of the one or more edge devices based on the aggregated set of metadata.

In some embodiments, the method includes identifying one or more connected devices based on the aggregated set of metadata and the one or more criteria and adjusting the operation of the one edge devices based on aggregated set of metadata and a set of information received from at least one of the one or more connected devices.

In some embodiments, the integrated sensor data is a first subset of the metadata and the operational data is a second subset of the metadata and aggregating the set of metadata according to the one or more criteria including creating at least one of a dictionary or lexicon configured to determine relationships within the set of metadata and determining relationships between the first subset of the metadata and the second subset of the metadata.

In some embodiments, aggregating the set of metadata according to the one or more criteria further includes mapping disparate representations using the at least one of the created dictionary or created lexicon.

In some embodiments, receiving sensor data from the plurality of sensors includes receiving data from at least one of a field controllers or a hydrocarbon site device.

In some embodiments, the at least one of the created dictionary or created lexicon includes categories that combine the criteria into one or more of the categories.

In some embodiments, aggregating the set of metadata according to the one or more criteria including using heuristics and a prior information of register contents to automatically infer engineering units of the sensor data.

In some embodiments, the processing circuit is further configured to perform an automatic scan to detect the one or more connected devices or one on or more criteria or a combination of the one or more connected devices and the one or more criteria.

Another implementation of the present disclosure is a computer readable media for aggregating metadata at hydrocarbon site including a processing circuit including one or more processors and memory storing instructions that, when executed by the one or more processors, causes the one or more processors to perform operations. The operations include receiving sensor data from a plurality of sensors, integrate the received sensor data into a set of metadata, the set of metadata including stored operational data of the hydrocarbon site, aggregate the set of metadata according to one or more criteria, the one or more criteria configured to categorize the received sensor data, identify one or more connected devices based on the aggregated set of metadata and the one or more criteria, and adjust operation of the one or more edge devices based on the aggregated set of metadata.

In some embodiments, the integrated sensor data is a first subset of the metadata and the operational data is a second subset of the metadata. In some embodiments, aggregating the set of metadata according to the one or more criteria includes creating at least one of a dictionary or lexicon configured to determine relationships within the set of metadata and determining relationships between the first subset of the metadata and the second subset of the metadata.

In some embodiments, aggregating the set of metadata according to the one or more criteria further includes mapping disparate representations using the at least one of the created dictionary or created lexicon.

In some embodiments, receiving sensor data from the plurality of sensors includes receiving data from at least one of a field controllers or a hydrocarbon site device.

In some embodiments, the at least one of the created dictionary or created lexicon includes categories that combine the criteria into one or more of the categories.

In some embodiments, aggregating the set of metadata according to the one or more criteria includes using heuristics and a prior information of register contents to automatically infer characteristics of the metadata.

In some embodiments, the processing circuit is further configured to perform an automatic scan to detect the one or more connected devices or one on or more criteria or a combination of the one or more connected devices and the one or more criteria.

Another implementation of the present disclosure is a method for aggregating metadata at hydrocarbon site. The method includes receiving sensor data from a plurality of sensors, integrating the received sensor data into a set of metadata, the set of metadata including stored operational data of a hydrocarbon site, aggregating the set of metadata according to one or more criteria, the one or more criteria configured to categorize the received sensor data, identifying one or more connected devices based on the aggregated set of metadata and the one or more criteria, and adjusting operation of the one or more edge devices based on the aggregated set of metadata.

In some embodiments, the integrated sensor data is a first subset of the metadata and the operational data is a second subset of the metadata. In some embodiments, aggregating the set of metadata according to the one or more criteria includes creating at least one of a dictionary or lexicon configured to determine relationships within the set of metadata and determining relationships between the first subset of the metadata and the second subset of the metadata and mapping at least part of the first subset of the metadata to at least part of the second subset of the metadata.

In some embodiments, aggregating the set of metadata according to the one or more criteria further includes mapping disparate representations using the at least one of the created dictionary or created lexicon.

In some embodiments, receiving sensor data from the plurality of sensors includes receiving data from at least one of a field controllers or a hydrocarbon site device.

In some embodiments, the at least one of the created dictionary or created lexicon includes categories that combine the criteria into one or more of the categories.

DETAILED DESCRIPTION

Before turning to the FIGURES, which illustrate certain exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Referring generally to the FIGURES, systems and methods are disclosed for analyzing metadata for various control schema, according to some embodiments. In some embodiments, certain methods may be implemented for aggregating like contexts or categories of data from a set of metadata at an oil site. In some embodiments, certain methods may be implemented to apply defined metadata and methods to map disparate representations by creating a dictionary (e.g., lexicon) which can include categories of data, metadata, or a relationship. In some embodiments, certain methods may be implemented to exchange, automatically distribute (publish/subscribe) using the created lexicon and aggregated metadata. In some embodiments, certain methods may be implemented for identifying connected devices by the characteristics of one or more aggregations.

System Overview

Hydrocarbon Site

Figure 1:
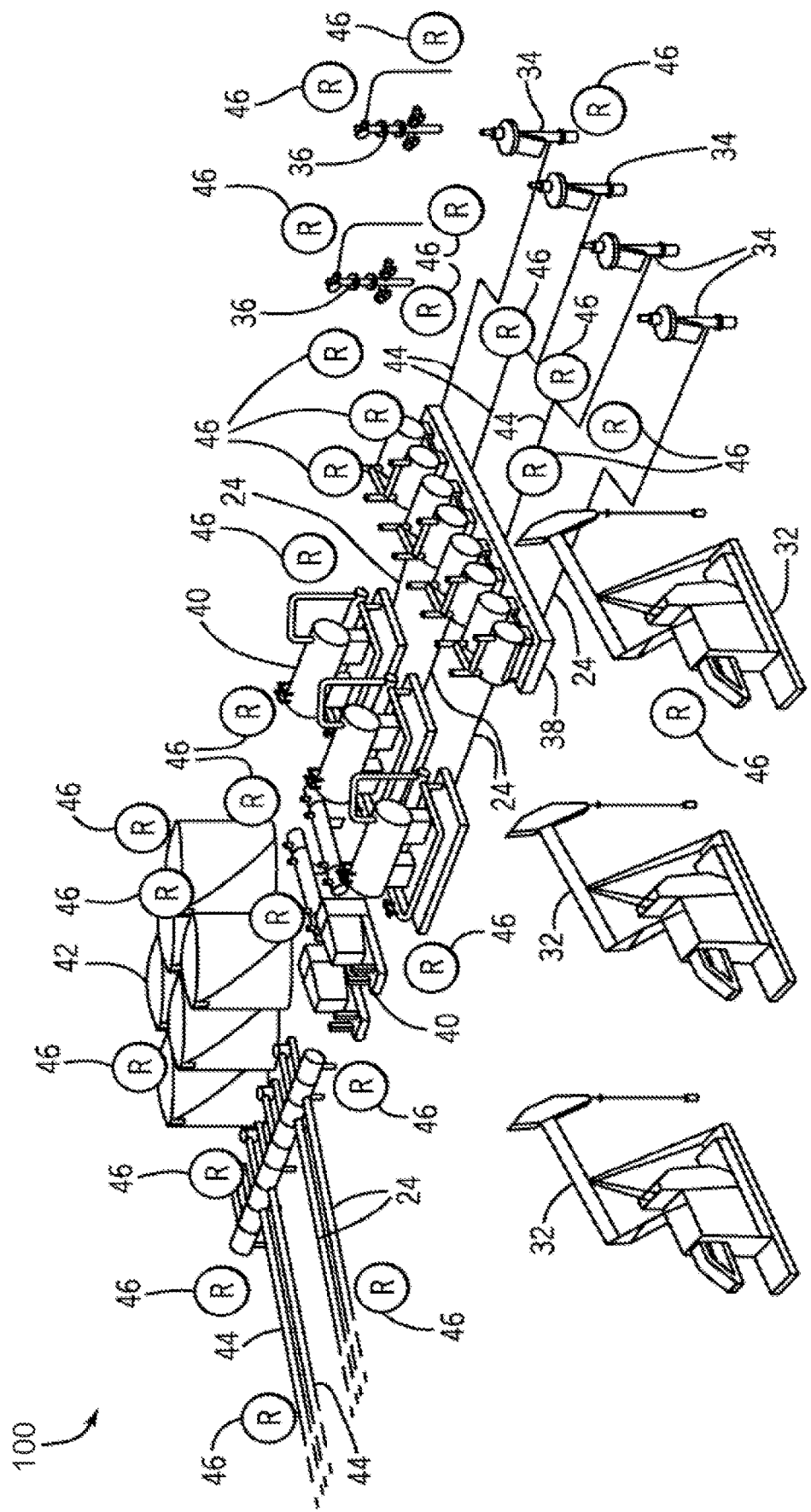
FIG. 1 is a perspective view of a hydrocarbon site equipped with well devices, according to some embodiments.

Referring now to FIG. 1, a hydrocarbon site 100 may be an area in which hydrocarbons, such as crude oil and natural gas, may be extracted from the ground, processed, transported and stored. As such, the hydrocarbon site 100 may include a number of wells and a number of well devices that may control the flow of hydrocarbons being extracted from the wells. In one embodiment, the well devices at the hydrocarbon site 100 may include any device equipped to monitor and/or control production of hydrocarbons at a well site. As such, the well devices may include pump jacks 32, submersible pumps 34, well trees 36, and other devices for assisting the monitoring and flow of liquids or gasses, such as petroleum, natural gasses and other substances. After the hydrocarbons are extracted from the surface via the well devices, the extracted hydrocarbons may be distributed to other devices such as wellhead distribution manifolds 38, separators 40, storage tanks 42, and other devices for assisting the measuring, monitoring, separating, storage, and flow of liquids or gasses, such as petroleum, natural gasses and other substances. At the hydrocarbon site 100, the pump jacks 32, submersible pumps 34, well trees 36, wellhead distribution manifolds 38, separators 40, and storage tanks 42 may be connected together via a network of pipelines 44. As such, hydrocarbons extracted from a reservoir may be transported to various locations at the hydrocarbon site 100 via the network of pipelines 44.

While the present application is generally disclosed with reference to systems and methods being implemented within an oil site (e.g., hydrocarbon site 100), various other sites may clearly be considered. For example, building HVAC systems, vehicle control systems, power systems, various embodiments of other oil and gas systems, and various other control systems. Particularly, the systems and methods disclosed herein (e.g., those that pertain to analyzing metadata, etc.) may implemented in any system that relates to collecting and analyzing data, and making control decisions based on that data, and the implementation of these systems and methods at a hydrocarbon site is purely an exemplary embodiment of such implementations.

The pump jack 32 may mechanically lift hydrocarbons (e.g., oil) out of a well when a bottom hole pressure of the well is not sufficient to extract the hydrocarbons to the surface. The submersible pump 34 may be an assembly that may be submerged in a hydrocarbon liquid that may be pumped. As such, the submersible pump 34 may include a hermetically sealed motor, such that liquids may not penetrate the seal into the motor. Further, the hermetically sealed motor may push hydrocarbons from underground areas or the reservoir to the surface.

The well trees 36 or christmas trees may be an assembly of valves, spools, and fittings used for natural flowing wells. As such, the well trees 36 may be used for an oil well, gas well, water injection well, water disposal well, gas injection well, condensate well, and the like. The wellhead distribution manifolds 38 may collect the hydrocarbons that may have been extracted by the pump jacks 32, the submersible pumps 34, and the well trees 36, such that the collected hydrocarbons may be routed to various hydrocarbon processing or storage areas in the hydrocarbon site 100.

The separator 40 may include a pressure vessel that may separate well fluids produced from oil and gas wells into separate gas and liquid components. For example, the separator 40 may separate hydrocarbons extracted by the pump jacks 32, the submersible pumps 34, or the well trees 36 into oil components, gas components, and water components. After the hydrocarbons have been separated, each separated component may be stored in a particular storage tank 42. The hydrocarbons stored in the storage tanks 42 may be transported via the pipelines 44 to transport vehicles, refineries, and the like.

The well devices may also include monitoring systems that may be placed at various locations in the hydrocarbon site 100 to monitor or provide information related to certain aspects of the hydrocarbon site 100. As such, the monitoring system may be a controller, a remote terminal unit (RTU), or any computing device that may include communication abilities, processing abilities, and the like. For discussion purposes, the monitoring system will be embodied as the RTU 46 throughout the present disclosure. However, it should be understood that the RTU 46 may be any component capable of monitoring and/or controlling various components at the hydrocarbon site 100. The RTU 46 may include sensors or may be coupled to various sensors that may monitor various properties associated with a component at the hydrocarbon site 10.

The RTU 46 may then analyze the various properties associated with the component and may control various operational parameters of the component. For example, the RTU 46 may measure a pressure or a differential pressure of a well or a component (e.g., storage tank 42) in the hydrocarbon site 100. The RTU 46 may also measure a temperature of contents stored inside a component in the hydrocarbon site 100, an amount of hydrocarbons being processed or extracted by components in the hydrocarbon site 100, and the like. The RTU 46 may also measure a level or amount of hydrocarbons stored in a component, such as the storage tank 42. In some embodiments, the RTU 46 may include some or all of the functionality of the following: iSens-GP Pressure Transmitter, iSens-DP Differential Pressure Transmitter, iSens-MV Multivariable Transmitter, iSens-T2 Temperature Transmitter, iSens-L Level Transmitter, or Isens-1O Flexible 1/0 Transmitter manufactured by vMonitor® of Houston, Texas.

In one embodiment, the RTU 46 may include a sensor that may measure pressure, temperature, fill level, flow rates, and the like. The RTU 46 may also include a transmitter, such as a radio wave transmitter, that may transmit data acquired by the sensor via an antenna or the like. The sensor in the RTU 46 may be wireless sensors that may be capable of receive and sending data signals between RTUs 26. To power the sensors and the transmitters, the RTU 46 may include a battery or may be coupled to a continuous power supply. Since the RTU 46 may be installed in harsh outdoor and/or explosion-hazardous environments, the RTU 46 may be enclosed in an explosion-proof container that may meet certain standards established by the National Electrical Manufacturer Association (NEMA) and the like, such as a NEMA 4X container, a NEMA 7X container, and the like.

The RTU 46 may transmit data acquired by the sensor or data processed by a processor to other monitoring systems, a router device, a supervisory control and data acquisition (SCADA) device, or the like. As such, the RTU 46 may enable users to monitor various properties of various components in the hydrocarbon site 100 without being physically located near the corresponding components. The RTU 46 can be configured to communicate with the devices at the hydrocarbon site 100 as well as mobile computing devices via various networking protocols.

In operation, the RTU 46 may receive real-time or near real-time data associated with a well device. The data may include, for example, tubing head pressure, tubing head temperature, case head pressure, flowline pressure, wellhead pressure, wellhead temperature, and the like. In any case, the RTU 46 may analyze the real-time data with respect to static data that may be stored in a memory of the RTU 46. The static data may include a well depth, a tubing length, a tubing size, a choke size, a reservoir pressure, a bottom hole temperature, well test data, fluid properties of the hydrocarbons being extracted, and the like. The RTU 46 may also analyze the real-time data with respect to other data acquired by various types of instruments (e.g., water cut meter, multiphase meter) to determine an inflow performance relationship (IPR) curve, a desired operating point for the wellhead 30, key performance indicators (KPis) associated with the wellhead 30, wellhead performance summary reports, and the like. Although the RTU 46 may be capable of performing the above-referenced analyses, the RTU 46 may not be capable of performing the analyses in a timely manner. Moreover, by just relying on the processor capabilities of the RTU 46, the RTU 46 is limited in the amount and types of analyses that it may perform. Moreover, since the RTU 46 may be limited in size, the data storage abilities may also be limited. The RTU 46 can be configured to receive time series data and provide time series data.

In certain embodiments, the RTU 46 may establish a communication link with the cloud-based computing system 12 described above. As such, the cloud-based computing system 12 may use its larger processing capabilities to analyze data acquired by multiple RTUs 26. Moreover, the cloud-based computing system 12 may access historical data associated with the respective RTU 46, data associated with well devices associated with the respective RTU 46, data associated with the hydrocarbon site 100 associated with the respective RTU 46 and the like to further analyze the data acquired by the RTU 46. The cloud-based computing system 12 is in communication with the RTU via one or more servers or networks (e.g., the Internet).

Site Control System

Figure 2:
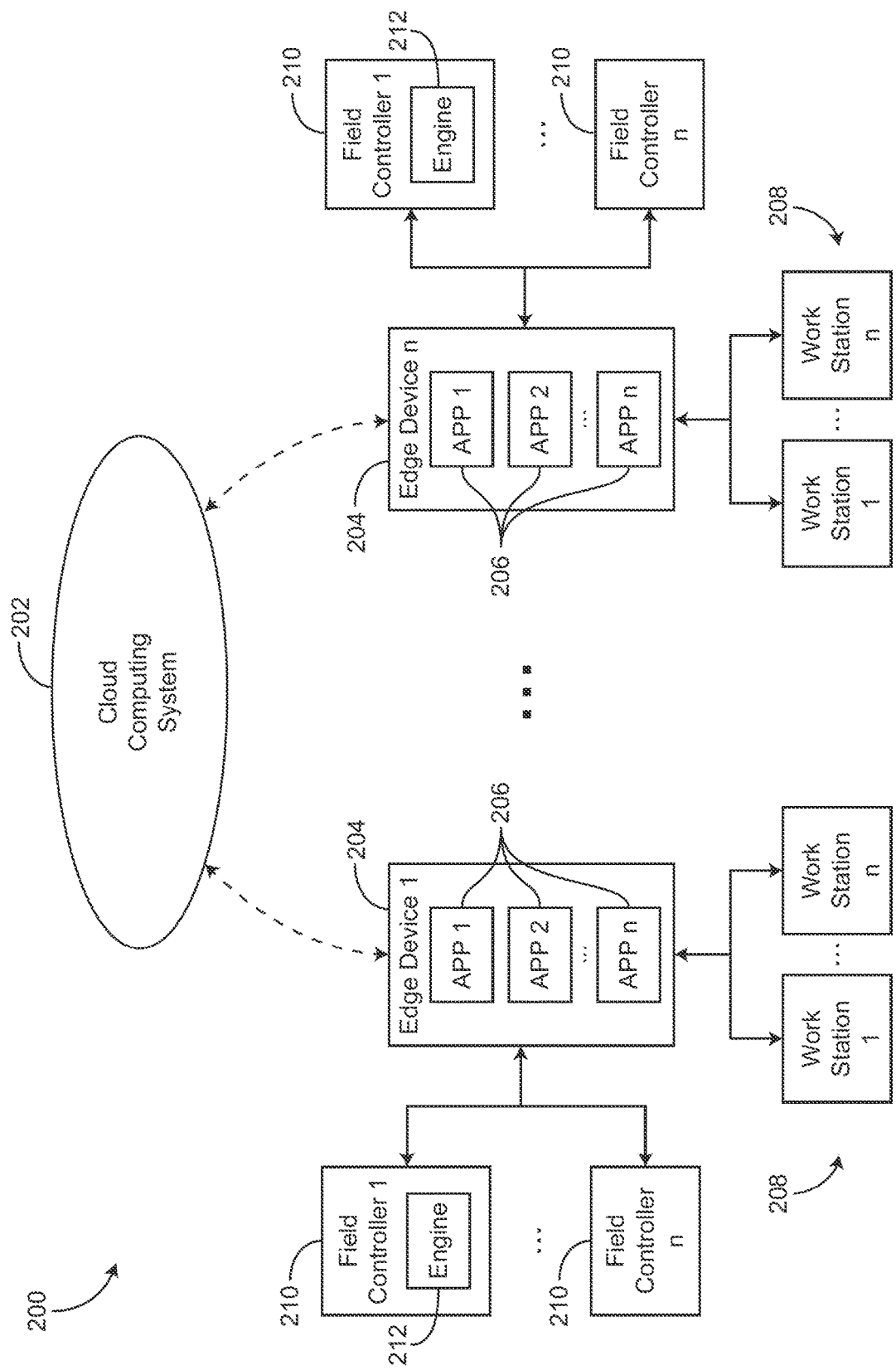
FIG. 2 is a block diagram of a control system for the hydrocarbon site of FIG. 1, according to some embodiments.

Referring particularly to FIG. 2, control system 200 for hydrocarbon site 100 is shown, according to some embodiments. In some embodiments, control system 200 includes or is configured to communicate with cloud computing system 202 and is configured to control various operations of a well site (e.g., hydrocarbon site 100) based on analyzing metadata from various devices within control system 200. Cloud computing system 202 may include any processing circuitry, processors, memory, etc., or combination thereof that are positioned remotely from hydrocarbon site 100. In various embodiments, some or all of the processing circuity, processors, memory, etc., or combination thereof within cloud computing system 202 may be performed by various devices disclosed within control system 200. Control system 200 is further shown to include edge devices 204, and workstations 208, and field controllers 210.

Edge devices 204 may be configured to run, perform, implement, store, etc., one or more applications 206 thereof. Additionally, some or all processing circuity, processors, memory, etc. included in various devices within control system 200 (e.g., edge device 204, field controller 210, workstation 208, etc.) may be distributed across several other devices within control system 200 or integrated into a single device. Edge device(s) 204 may be configured to receive data from field controller(s) 210 and provide data analytics to cloud computing system 202 based on the received data. This is described in greater detail below with reference to FIG. 3.

In some embodiments, some or all of the functionality of field controller(s) 210 is integrated partially or entirely within edge device (s) 204. For example engine 212 is implemented in edge device 204 using one or more applications 206. In some embodiments, some or all of the functionality of edge device 204 is incorporated partially or entirely within field controller(s) 210. For example, one or more applications 206 are stored and/or processed within engine 212 of field controller (1) 210.

While cloud computing system 202 is generally disclosed herein as performing some or all of the functionality of the methods disclosed herein, cloud-based architecture (e.g., cloud computing system 202 connected to edge device(s) 204 and field controller 210, etc.) is purely an exemplary embodiment and is not intended to be limiting. In some embodiments, the methods disclosed herein may be implemented by systems that do not include or utilize a cloud-based computing system (e.g., cloud computing system 202). In some embodiments, the systems and methods disclosed herein are architecture agnostic, such that they may be implemented across a variety of architectures including private or on premise server infrastructure.

In some embodiments, each edge device 204 includes a processing circuit having a processor and memory. The processor can be a general purpose or specific purpose processor, an application specific integrated circuit (ASIC), one or more field programmable gate arrays (FPGAs), a group of processing components, or other suitable processing components. The processor is configured to execute computer code or instructions stored in the memory or received from other computer readable media (e.g., CDROM, network storage, a remote server, etc.), according to some embodiments.

In some embodiments, the memory can include one or more devices (e.g., memory units, memory devices, storage devices, etc.) for storing data and/or computer code for completing and/or facilitating the various processes described in the present disclosure. The memory can include random access memory (RAM), read-only memory (ROM), hard drive storage, temporary storage, non-volatile memory, flash memory, optical memory, or any other suitable memory for storing software objects and/or computer instructions. The memory can include database components, object code components, script components, or any other type of information structure for supporting the various activities and information structures described in the present disclosure. The memory can be communicably connected to the processor via the processing circuitry and can include computer code for executing (e.g., by the processor) one or more processes described herein.

In some embodiments, various edge device(s) 204 may include some or all functionality of remote terminal units (RTUs) (e.g., RTU 46). In various embodiments, edge device(s) 204 is not limited to the functionality of RTU's and can include other controller features. Similarly, RTU's, as described herein, may refer to any industrial edge controller which is programmable and/or capable of one or more applications, either individually or as a module within a broader system (e.g., system 200).

Field controllers 210 may be configured to control various operations at a well site and are communicably coupled with edge devices 204. In some embodiments, field controllers 210 are configured to operate (e.g., provide control signals to, provide setpoints to, adjust setpoints or operational parameters thereof) field equipment (e.g., electric submersible pumps (ESPs), cranes, pumps, etc.) of hydrocarbon site 100. Field controllers 210 may be grouped into different sets based on which edge device 204 field controller 210 communicate with. In some embodiments, edge device(s) 204 are configured to exchange any sensor data, measurement data, meter data (e.g., flow meter data), storage data, maintenance data, control signals, setpoint adjustments, operational adjustments, diagnostic data, analytics data, meta data, etc., with field controllers 210. It should be understood that each edge device 204 can be associated with, corresponding to, etc., multiple field controllers 210.

In some embodiments, one or more of field controllers 210 can include a computing engine 212. Computing engine 212 can be configured to perform various control, diagnostic, analytic, reporting, meta data-related, etc., functions. Computing engine 212 can be embedded in one or more of field controller 210, or may be embedded at one or more of edge devices 204. In some embodiments, any of the functionality of computing engine 212 is distributed across multiple edge devices 204 and/or multiple field controllers 210. In some embodiments, any of the functionality of computing engine 212 is performed by cloud computing system 202.

Still referring to FIG. 2, work stations 208 may be configured to receive user instructions for controlling hydrocarbon site 100 and provide control signals to various devices via control system 200. Work stations 208 can include any desktop computer, laptop computer, personal computer device, user interface, personal computer device, etc., or any general computing device thereof. In some embodiments, multiple work stations 208 (e.g., an n number of work stations 208) are associated with each edge device 204, while in other embodiments, one or more of edge devices 204 are associated with a single work station 208.

In some embodiments, field controller(s) 210 may be configured to act as edge devices such that field controller(s) 210 perform additional processing (e.g., data analysis, mapping, etc.) prior to providing information to cloud computing system 202. In some embodiments, this decreases latency in information processing to cloud computing system 202. In other embodiments, edge device(s) 204 operate as traditional edge devices and perform significant storage and processing within control system 200 (e.g., on-site, at/near hydrocarbon site 100, etc.) to mitigate latency due to processing information in cloud computing system 202.

Field Controller

Figure 3:
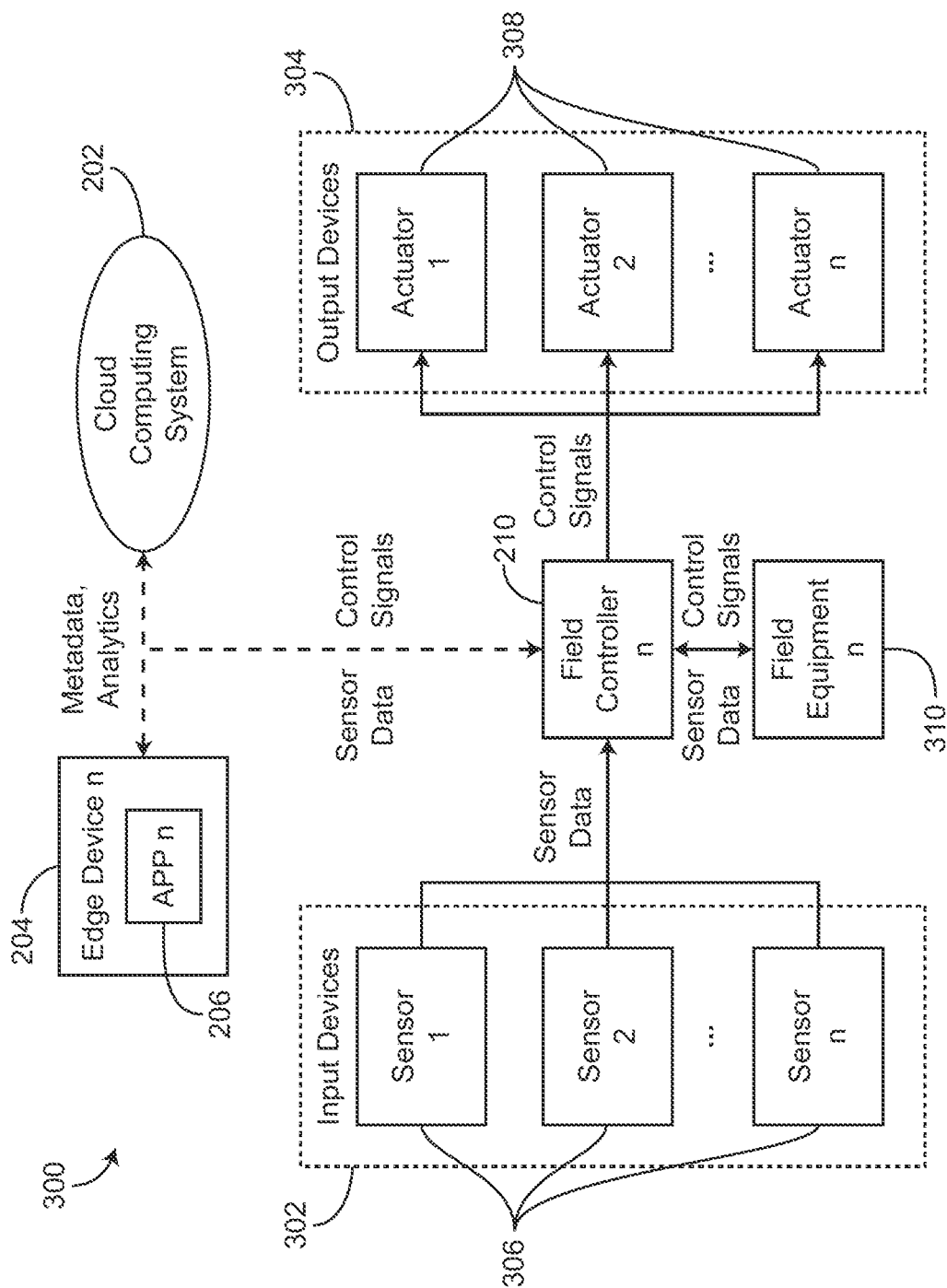
FIG. 3 is a block diagram of a portion of the control system of FIG. 2, showing a field controller communicating with field equipment, input devices, and output devices, according to some embodiments.

Referring now to FIG. 3, control system 200 for performing control of output devices 304 based on input devices 302 is shown, according to exemplary embodiments. Control system 200 is shown to include edge device 204 including application 206, cloud computing system 202, field controller 210, field equipment 310, input devices 302, and output devices 304.

Input devices 302 may be configured to provide various sensor data and/or field measurements from hydrocarbon site 100 to field controller 210 for processing. For example, Sensor 306 of input devices 302 is measuring the pump speed of pump 34. Sensor 306 provides the pump speed of pump 34 to field controller 210 at regular intervals (e.g., continuously, ever minute, every 5 minutes, etc.). Input devices 302 may be connected wired or wirelessly to field controller 210 or any other device within system 200 (e.g., edge device 204). In some embodiments, input devices 302 are coupled to various site equipment (e.g., pumps, pump jacks, cranes, etc.) and provide operational data of their respective site equipment to field controller 210.

While the systems and methods disclosed herein are generally referring to input and output devices as being sensors and actuators, respectively, this is merely meant to be exemplary and should not be considered limiting. Other types of input devices and output devices may be considered. For example, input devices 203 may be or include a machine learning algorithm running on edge device 204. In another example, output device 304 may be a reinforcement learning algorithm. Of course, several other possible device types and/or implementations can be contemplated.

In some embodiments, sensor(s) 306 refer to physical sensors (e.g., temperature sensors, flow sensors, etc.) and/or virtual sensors (e.g., inferential sensors, soft sensors, etc.). In some embodiments, virtual sensors provide identical or similar information as would a physical sensor, only via software applications. In some embodiments, virtual sensors learn to interpret the relationships between the different variables, and observe readings from various instruments. For example, rather than implementing several physical sensors at a site (e.g., hydrocarbon site 100), one or more virtual sensors may be placed on a simulation model to achieve identical or similar results.

Output devices 304 may be configured to receive control signals from field controller 210 and adjust operation based on the received control signals. For example, field controller 210 determines that pump 34 is operating at a lower pump speed than is considered optimal. Field controller 210 subsequently sends a control signal to actuator 308 to increase pump speed for pump 34. In some embodiments, output devices 304 are configured to act as any device (e.g., actuator, etc.) capable of adjusting operation of site equipment within hydrocarbon site 100. In some embodiments, various other field equipment (e.g., field equipment 310) include some or all of the functionality of input devices 302 and output devices 304 and provide sensor data and receive control signals from field controller 210.

In some embodiments, control system 200 is configured to analyze various sets of data (e.g., metadata) to determine control schema that is optimal for hydrocarbon site 100. A significant amount of processing for this may be performed by edge devices (e.g., edge device 204), instead of processing all metadata analytics in the cloud, as processing the data in on-site or proximate edge devices can decrease latency compared to sending the data to cloud computing system 202 for processing. For example, sensors 306 provide metadata to field controller 210. Field controller 210 processes the data to determine the type of data and/or domain from which the data is received and provides the data to edge device 204 for analytics. An application within edge device 204 (e.g., application 206) may analyze the metadata to make decisions about the control schema that would have been otherwise unnoticed by processing within control system 200. For example, application 206 may infer that the data received has been received by a flow meter sensor (e.g., sensor (1) 306), based on the patterns seen in the data and a priori data that edge device 204 has analyzed. Application 206 may make inferences, predictions, and calculations based on current and/or past data.

In some embodiments, application 206 provides some or all of the data to cloud computing system 202 for further processing. Application 206 may be configured to make inferences about received data that improves the standardization of data analytics. For example, sensor (1) 306 and sensor (2) 306 may be flow sensors, but from different vendors. As such, sensor (1) 306 may provide data to field controller 210 in a different format than sensor (2) 306. However, application 206 of edge device 204 may still be able to standardize the data and determine that both sets of data are from flow sensors, despite the received data being in different formats (e.g., one data set is provided under resource description framework (RDF) specifications, one data set is provided as data objects, etc.). In various embodiments, allowing edge device 204 to perform some or all of the metadata analytics allows for improved data analytics and control schema without significantly increasing processing latency.

Metadata Analytics

Metadata Aggregation Processes

Figure 4:
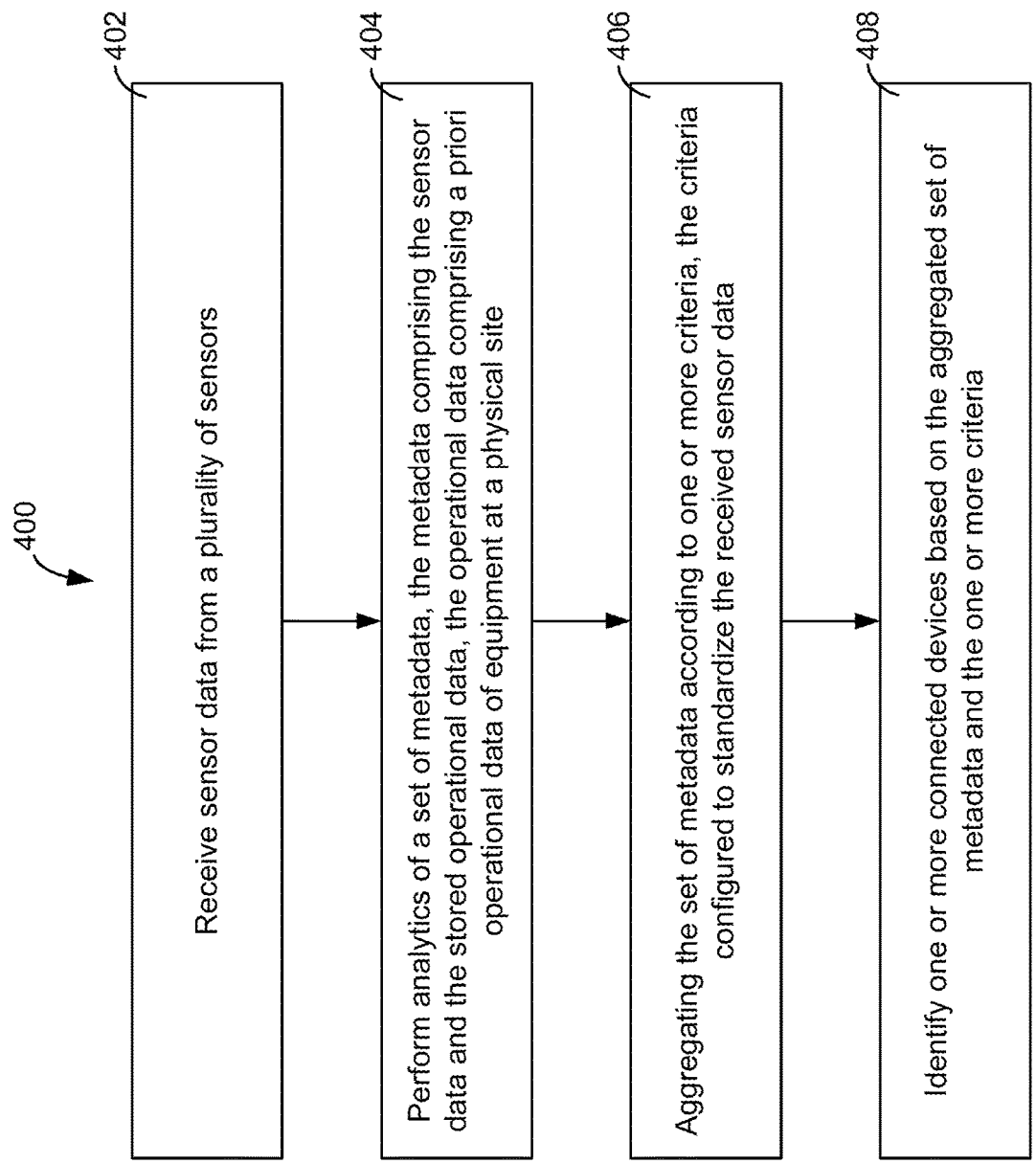
FIG. 4 is a flow diagram of a process for determining metadata analytics for control schemes which can be performed by the control system of FIG. 2, according to some embodiments.

Referring now to FIG. 4, a process 400 for determining metadata analytics for control schemes is shown, according to exemplary embodiments. Process 400 may be performed by any of the various processing components disclosed in control system 200. For example, process 400 may be performed by edge device 204. In other embodiments, process 400 is implemented by field controller 210. Process 400 may additionally be distributed across various devices for processing.

Process 400 is shown to include receiving data from a plurality of sensors (step 402). In some embodiments, sensors 306 provide sensor data to field controller 210. Sensor data may relate to any of the operations necessary for pumping various hydrocarbons and routing the hydrocarbons to wells for storage or further processing. In some embodiments, sensor data includes temperature measurements, flow measurements, power measurements, and various other parameters. The sensor data may be provided wired or wirelessly (e.g., via Wi-Fi, Bluetooth, radio frequency (RF), etc.).

Process 400 is shown to include performing analytics of a set of metadata, the metadata comprising the sensor data and the stored operational data, the operational data comprising a priori operational data of equipment at a physical site (step 404). In some embodiments, the meta data may include a description of the equipment or name of the equipment, a communication identification, a port identification, unit value identification, range identification, type of signal (e.g., analog or digital), hierarchy of the data, identification of data or sensors redundant to the data or sensor providing the data, etc. One or more processing devices (e.g., field controller 210, edge device 204, etc.) may bring in large amounts of data (i.e., metadata) (e.g., 100 GB, 1 TB, etc.) and make inferences or predictions based on the received metadata. In some embodiments, the system may bring in more data than can be practically or economically stored or transmitted over the network such that the incoming data is reduced to smaller volumes of manageable information. In some embodiments, the data is received from various devices in various formats. For example, one sensor provides flow measurements for "PUMP A." Another sensor provides measurements for the temperature of the fluid flowing through PUMP A, but provides the temperature measurements with the header as "PUMP 1." Edge device 204, via application 206, can infer that both sensors are referring to the same pump, based on previous measurements received and various a priori data (e.g., installation notes, etc.).

Process 400 is shown to include aggregating the set of metadata according to one or more criteria, the criteria configured to standardize the received sensor data (step 400). In some embodiments, the meta is categorized such that interaction between various applications is facilitated.

For example, inside of a logic rack, a relationship is established between bits of an application that are exposed to real-time environment, or bits that are configurable, or bits that are communicated to a system (e.g., certain bits are marked as being consumable by system X such as a cloud based system). In some embodiments, application 206 may be treated as function blocks. Application 206 may subscribe to particular tags, inputs, or outputs similar to function blocks.

In some embodiments, a service of application 206 may detect when application initially comes online. Application 206 may self-describe required data inputs and data outputs. In some embodiments, the service of application 206 may identify where to route data from for the required data inputs of the application, and required transformations (e.g., engineering units). The service may identify where to route data from for the required data inputs of the application, and required transformations (e.g., engineering units). In some embodiments, application 206 can be 206 publishes the metadata and one or more services from application 206 adds a new identifier/tag for a mapping scheme.

In some embodiments, the data may be assembled into a hierarchy. For example, one or more sets of data may be considered a higher level over other sets of data such that the higher sets of data are considered more important in terms of processing. In other embodiments, the portions of data are hierarchical such that the equipment that the data is mapped in a hierarchical structure. Application 206 may be assembled around a particular piece of equipment or device. In some embodiments, the data may be aggregated according to levels (e.g., categories, context, etc.). For example, data X is a setpoint (e.g., the category) and data X is a setpoint in system Y (e.g., choke setting, speed setting, etc.) (e.g., the context). Changing the setpoint in one application (e.g., application 206) may notify other applications (e.g., a walled garden, discovery service, etc.).

In some embodiments, the service may be implemented as an exchange application to give a common interface. For example, the various sets of data within the metadata is standardized and displayed onto a single interface (e.g., computer screen, phone screen, tablet screen, etc.) such that all unformatted data received can be displayed after analysis and/or standardization. In some embodiments, the service may be implemented as a suggestion tool (e.g., for when applications come online) to give suggested mappings but require user confirmation and/or adjustment prior to the mappings being used.

In some embodiments, received data may be integrated into a set of metadata that includes stored operational data of the hydrocarbon site. In some embodiments, the metadata may be a property of the structure of the data, its mechanism for delivery, one or more other properties, or any combination thereof. While general embodiments refer to the integration as a transformation of the data itself, this is merely exemplary and is not considered limiting.

Process 400 is shown to include identifying one or more connected devices based on the aggregated set of metadata and the one or more criteria (step 408). In some embodiments, once the data has been aggregated, analyzed data may be presented to a user interface for displaying equipment information. In some embodiments, the equipment information shows the relationships between the equipment based on the metadata analytics. For example, based on sensor measurements received from a flow sensor at pump 34 and a power sensor at pump jack 32 may provide the relationship between pump 34 and pump jack 32.

Metadata Disparate Mapping Processes

Figure 5:
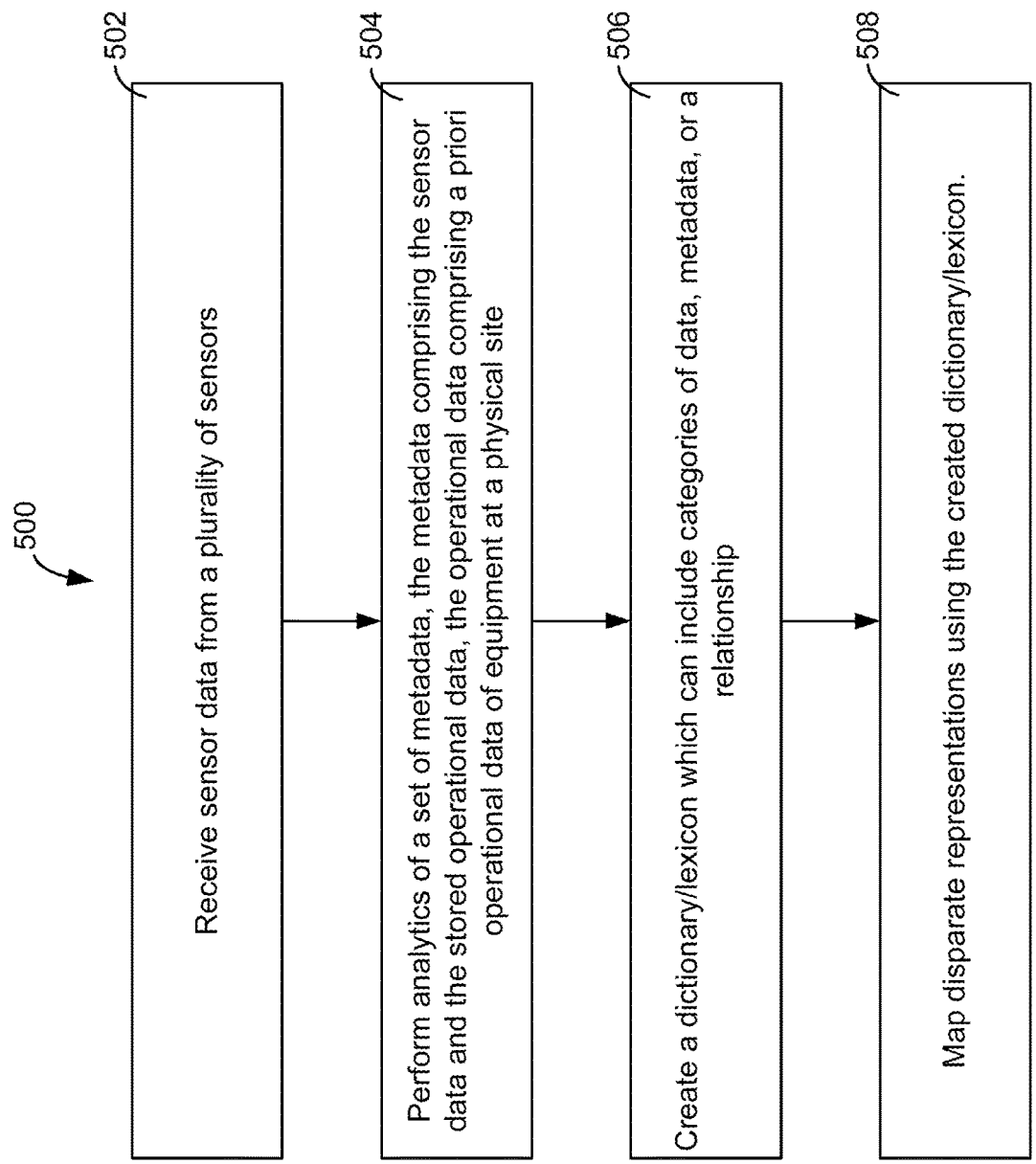
FIG. 5 is a flow diagram of a process for applying defined metadata and methods to map disparate representations, which can be performed by the control system of FIG. 2, according to some embodiments.

Referring now to FIG. 5, a process 500 for applying defined metadata and methods to map disparate representations is shown, according to exemplary embodiments. Process 500 may be performed by any of the various processing components disclosed in control system 200. For example, process 500 may be performed by edge device 204. In other embodiments, process 500 is implemented by field controller 210. Process 500 may additionally be distributed across various devices for processing.

Process 500 is shown to include receiving data from a plurality of sensors (step 502). In some embodiments, sensors 306 provide sensor data to field controller 210. Sensor data may relate to any of the operations necessary for pumping various hydrocarbons and routing the hydrocarbons to wells for storage or further processing. In some embodiments, sensor data includes temperature measurements, flow measurements, power measurements, and various other parameters. The sensor data may be provided wired or wirelessly (e.g., via Wi-Fi, Bluetooth, radio frequency (RF), etc.).

Process 500 is shown to include performing analytics of a set of metadata, the metadata comprising the sensor data and the stored operational data, the operational data comprising a priori operational data of equipment at a physical site (step 502). One or more processing devices (e.g., field controller 210, edge device 204, etc.) may bring in large amounts of data (i.e., metadata) (e.g., 100 GB, 1 TB, etc.) and make inferences or predictions based on the received metadata. In some embodiments, the data is received from various devices in various formats. For example, one sensor provides flow measurements for "PUMP A." Another sensor provides measurements for the temperature of the fluid flowing through PUMP A, but provides the temperature measurements with the header as "PUMP 1." Edge device 204, via application 206, can infer that both sensors are referring to the same pump, based on previous measurements received and various a priori data (e.g., installation notes, etc.).

Process 500 is shown to include creating a dictionary/lexicon which can include categories of data, metadata, or a relationship (step 506). In some embodiments, the relationships between different sets of data and/or the data and operational equipment need to be described and stored (e.g., within a library, within a dictionary, etc.) such that mapping may occur. For example, the template is established that maps various sets of data with the header (e.g., title, header file, etc.) of "Pump," "PUMP A" "PUMP 34" and "pump" to data for pump 34.

Process 500 is shown to include mapping disparate representations using the created dictionary or lexicon (e.g., step 508). In some embodiments, mapping is performed using various methods, such as mapping or categorizing (e.g., breaking the metadata into sections, etc.). The various data mapping techniques may be used to identify one or more devices in system 200. For example, if a device transmits information that is similar to data already analyzed/stored by edge device 204, edge device 204 may be configured to automatically detect what type of device is providing the data. This may be referred to as device detection or device identification. Processing relating to device identification is described in greater detail below with reference to FIG. 7.

Metadata Subscription Exchange Processes

Figure 6:
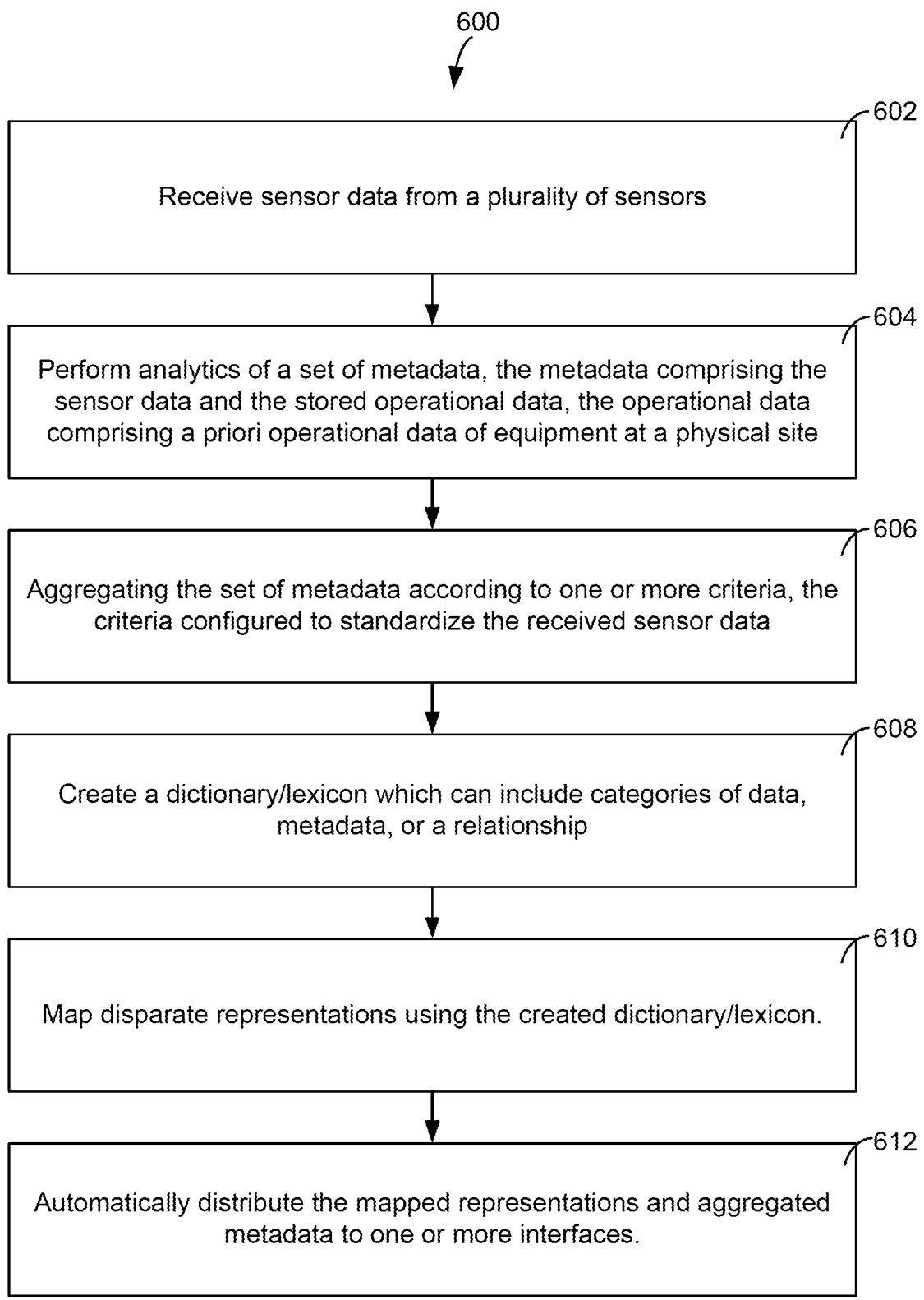
FIG. 6 is a flow diagram of a process for automatically distributing mapped representations and aggregated metadata to one or more interfaces, which can be performed by the control system of FIG. 2, according to some embodiments.

Referring now to FIG. 6, a process 600 for automatically distributing mapped representations and aggregated metadata to one or more interfaces is shown, according to exemplary embodiments. Process 600 may be performed by any of the various processing components disclosed in control system 200. For example, process 600 may be performed by edge device 204. In other embodiments, process 600 is implemented by field controller 210. Process 600 may additionally be distributed across various devices for processing.

Process 600 is shown to include receiving data from a plurality of sensors (step 602). In some embodiments, sensors 306 provide sensor data to field controller 210. Sensor data may relate to any of the operations necessary for pumping various hydrocarbons and routing the hydrocarbons to wells for storage or further processing. In some embodiments, sensor data includes temperature measurements, flow measurements, power measurements, and various other parameters. The sensor data may be provided wired or wirelessly (e.g., via Wi-Fi, Bluetooth, radio frequency (RF), etc.).

Process 600 is shown to include performing analytics of a set of metadata, the metadata comprising the sensor data and the stored operational data, the operational data comprising a priori operational data of equipment at a physical site (step 604). One or more processing devices (e.g., field controller 210, edge device 204, etc.) may bring in large amounts of data (i.e., metadata) (e.g., 100 GB, 1 TB, etc.) and make inferences or predictions based on the received metadata. In some embodiments, the data is received from various devices in various formats. For example, one sensor provides flow measurements for "PUMP A." Another sensor provides measurements for the temperature of the fluid flowing through PUMP A, but provides the temperature measurements with the header as "PUMP 1." Edge device 204, via application 206, can infer that both sensors are referring to the same pump, based on previous measurements received and various a priori data (e.g., installation notes, etc.).

Process 600 is shown to include aggregating the set of metadata according to one or more criteria, the criteria configured to standardize the received sensor data (step 606). In some embodiments, the meta is categorized such that interaction between various applications is facilitated. For example, inside of a logic rack, a relationship is established between bits of an application that are exposed to real-time environment, or bits that are configurable, or bits that are communicated to a system (e.g., certain bits are marked as being consumable by system X such as a cloud based system). In some embodiments, application 206 may be treated as function blocks. Application 206 may subscribe to particular tags, inputs, or outputs similar to function blocks.

Process 600 includes creating a dictionary/lexicon which can include categories of data, metadata, or a relationship (step 608) in some embodiments. In some embodiments, the relationships between different sets of data and/or the data and operational equipment need to be described and stored (e.g., within a library, within a dictionary, etc.) such that mapping may occur. For example, the template is established that maps various sets of data with the header (e.g., title, header file, etc.) of "Pump," "PUMP A" "PUMP 34" and "pump" to data for pump 34.

Process 600 is shown to include mapping disparate representations using the created dictionary or lexicon (e.g., step 610). In some embodiments, mapping is performed using various methods, such as mapping or categorizing (e.g., breaking the metadata into sections, etc.). The various data mapping techniques may be used to identify one or more devices in system 200. For example, if a device transmits information that is similar to data already analyzed/stored by edge device 204, edge device 204 may be configured to automatically detect what type of device is providing the data. This may be referred to as device detection or device identification. Processing relating to device identification is described in greater detail below with reference to FIG. 7.

Process 600 is shown to further include automatically distributing the mapped representations and aggregated metadata to one or more interfaces (step 612). In some embodiments, the determinations from processing the metadata (e.g., inferences, mapped relationships, categories, etc.) are distributed to various devices. In some embodiments, the metadata analytics is performed on an edge device (e.g., edge device 204), then the processed information is provided to cloud computing system 202 for storage or transmission to other systems. This method may decrease latency by not requiring that the metadata be sent to a cloud (e.g., cloud computing system 202) for processing. Instead, only the results of the metadata analytics needs to be provided to cloud computing system 202.

In some embodiments, process 600 can include creating a data pipeline that facilitates transmission of data. This may include keeping a registry of applications, such that different structures and different naming of sets of data allow data to be linked despite different naming. In some embodiments, a graph database may be used to facilitate data grouping (e.g., namespace identification) or data storage. In some embodiments, the data may be categorized based on the type of data. For example, the data (e.g., metadata) has different categories (e.g., setpoint, input, output) it is placed into during process 600.

In some embodiments, applications/devices can subscribe to a specific category or specific item (e.g., all setpoints, or particular setpoints, etc.). In some embodiments, data may be assigned context (e.g., tubing pressure, ESP speed, etc.). In some embodiments, application 206 can use a blocking service (e.g., walled garden, etc.) to ensure proper engineering units and/or precision (e.g., using transformations, etc.).

Device Identification Based on Data Mapping

Figure 7:
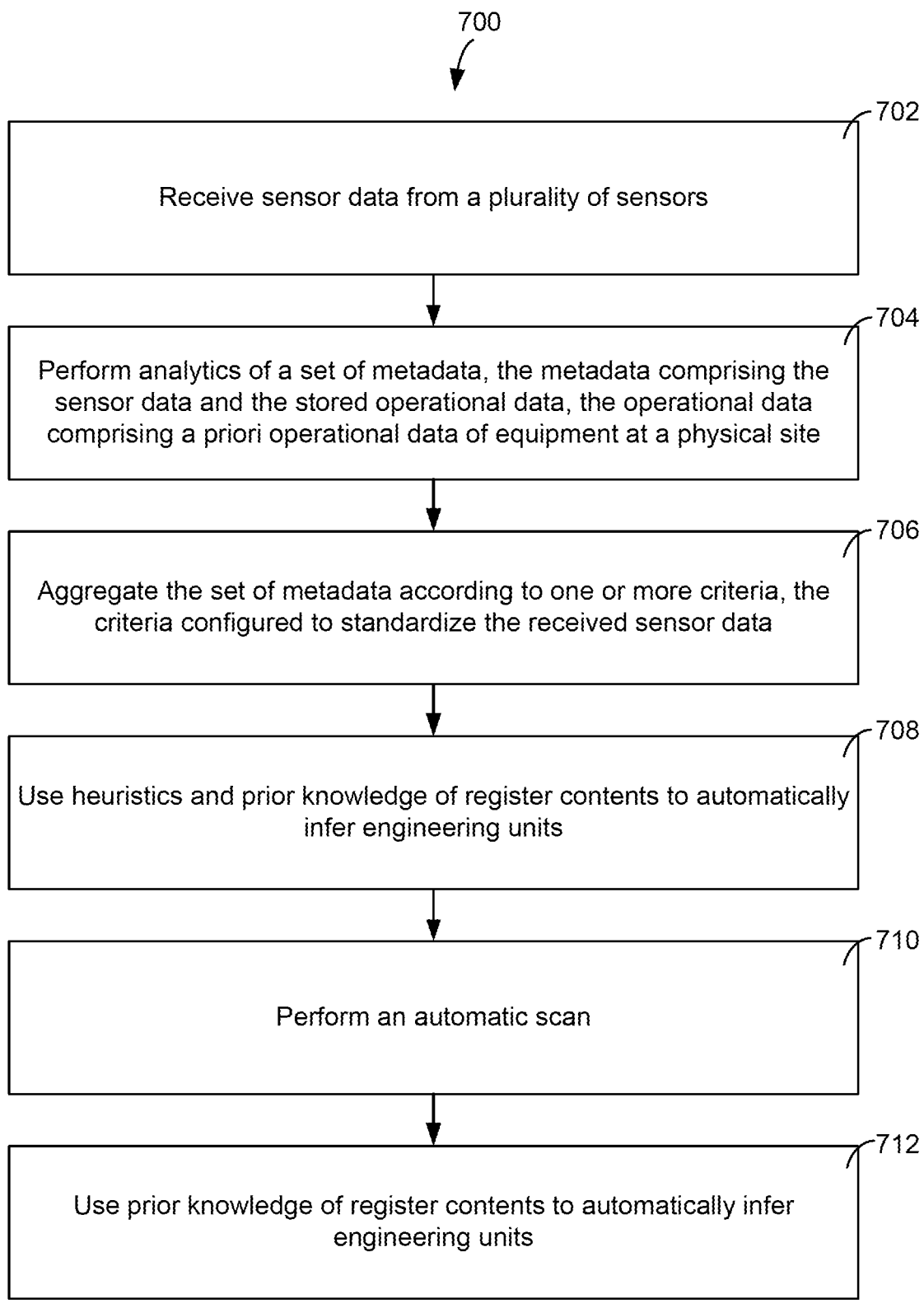
FIG. 7 is a flow diagram of a process for identifying connected devices based on the characteristics connected devices via data mapping, which can be performed by the control system of FIG. 2, according to some embodiments.

Referring now to FIG. 7, a process 700 for managing edge devices in a control system, according to some embodiments. Process 700 may be performed by any of the various processing components disclosed in control system 200. For example, process 700 may be performed by edge device 204. In other embodiments, process 700 is implemented by field controller 210. Process 700 may additionally be distributed across various devices for processing.

Process 700 is shown to include receiving data from a plurality of sensors (step 704). In some embodiments, sensors 306 provide sensor data to field controller 210. Sensor data may relate to any of the operations necessary for pumping various hydrocarbons and routing the hydrocarbons to wells for storage or further processing. In some embodiments, sensor data includes temperature measurements, flow measurements, power measurements, and various other parameters. The sensor data may be provided wired or wirelessly (e.g., via Wi-Fi, Bluetooth, radio frequency (RF), etc.).

Process 700 is shown to include performing analytics of a set of metadata, the metadata comprising the sensor data and the stored operational data, the operational data comprising a priori operational data of equipment at a physical site (step 704). One or more processing devices (e.g., field controller 210, edge device 204, etc.) may bring in large amounts of data (i.e., metadata) (e.g., 100 GB, 1 TB, etc.) and make inferences or predictions based on the received metadata. In some embodiments, the data is received from various devices in various formats. For example, one sensor provides flow measurements for "PUMP A." Another sensor provides measurements for the temperature of the fluid flowing through PUMP A, but provides the temperature measurements with the header as "PUMP 1." Edge device 204, via application 206, can infer that both sensors are referring to the same pump, based on previous measurements received and various a priori data (e.g., installation notes, etc.). The data may be aggregated between real time processing and optimization and other inferred sensors, in some embodiments.

In some embodiments, "real time" or "real time processing" may be or include the execution of data in a short time period, providing near-instantaneous output. The processing may be done as the data is inputted, which can require continuous stream of input data in order to provide a continuous output. This type of processing may be contrasted by a batch data processing system, which may collect data and then processes all the data in bulk in a later time.

In some embodiments, aggregations of sensor data may be adjusted based on the removal of one or more sensors. For example, upon aggregation of data received from several sensors, sensor 306 is removed from system 300. Edge device 204 may then remove or stop considering the data from sensor 306. The data sets and/or data elements from sensor 306 may subsequently be removed from the set of metadata, in some embodiments.

Process 700 is shown to include aggregating the set of metadata according to one or more criteria, the criteria configured to standardize the received sensor data (step 706). In some embodiments, the meta is categorized such that interaction between various applications is facilitated. For example, inside of a logic rack, a relationship is established between bits of an application that are exposed to real-time environment, or bits that are configurable, or bits that are communicated to a system (e.g., certain bits are marked as being consumable by system X such as a cloud based system). In some embodiments, application 206 may be treated as function blocks. Application 206 may subscribe to particular tags, inputs, or outputs similar to function blocks.

Process 700 is shown to include using heuristics and prior knowledge of metadata contents to automatically infer characteristics of the metadata (step 708). In some embodiments, various information may be inferred from the received metadata, such as the type of data, the units of the data, the location that the data was received from, etc. For example, sensor 306 is a flow sensor that provides flow data to field controller 210 and/or edge device 204. Application 206 of edge device 204 is able to determine the units in which the flow data is provided based on a priori data received from similar sensors or the same sensor in previous instances. Particularly, sensor 306 may provide sensor data that indicates pump 34 is pumping at 20 units. Application 206 may infer that this value is in gallons per minutes (gpm) based on a priori data. In some embodiments, the characteristics of the metadata that are inferred include engineering units, scaling, limits, ordinals, associations, relationships, resolutions, accuracies, magnitudes, identity, or any combination thereof.

Process 700 is shown to include performing an automatic scan (step 710). In some embodiments, an automatic scan may be implemented by one or more processing devices (e.g., edge device 204, etc.) to scan for various data within the system. For example, the scan may include scanning for newly connected devices in the system. In some embodiments, the automatic scan includes scanning for specific types of data, or data from specific devices, or data from one or more specific devices, or data from a particular region or location, or any other criteria for collecting data. In some embodiments, the criteria or rules for the scan may be implemented based on categories established aggregating the metadata.

Figure 8A:
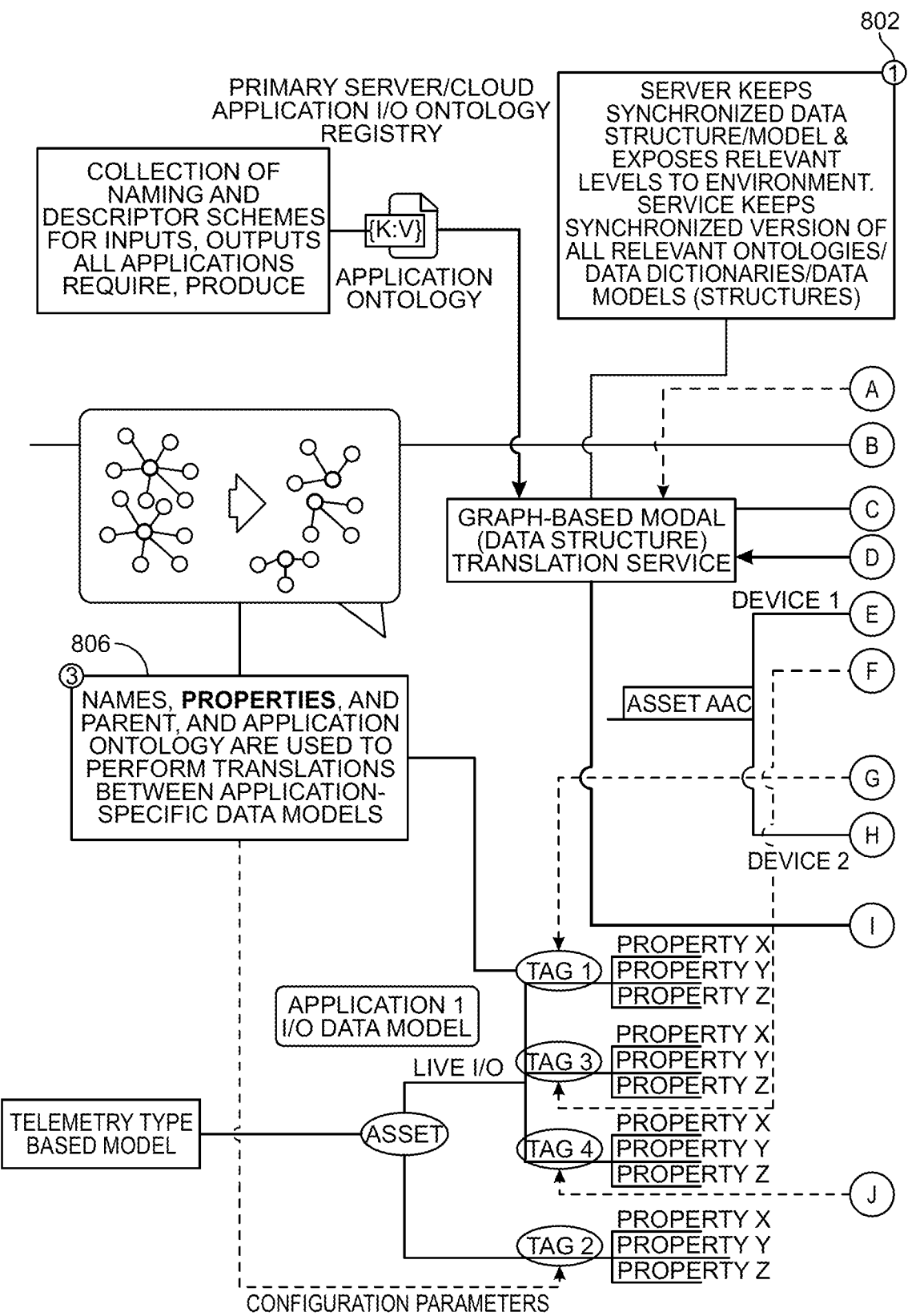
FIG. 8A is a first portion of a diagram of a high-level overview of methods for implementing control based on metadata analytics which can be part of the control system of FIG. 2, according to some embodiments.
Figure 8B:
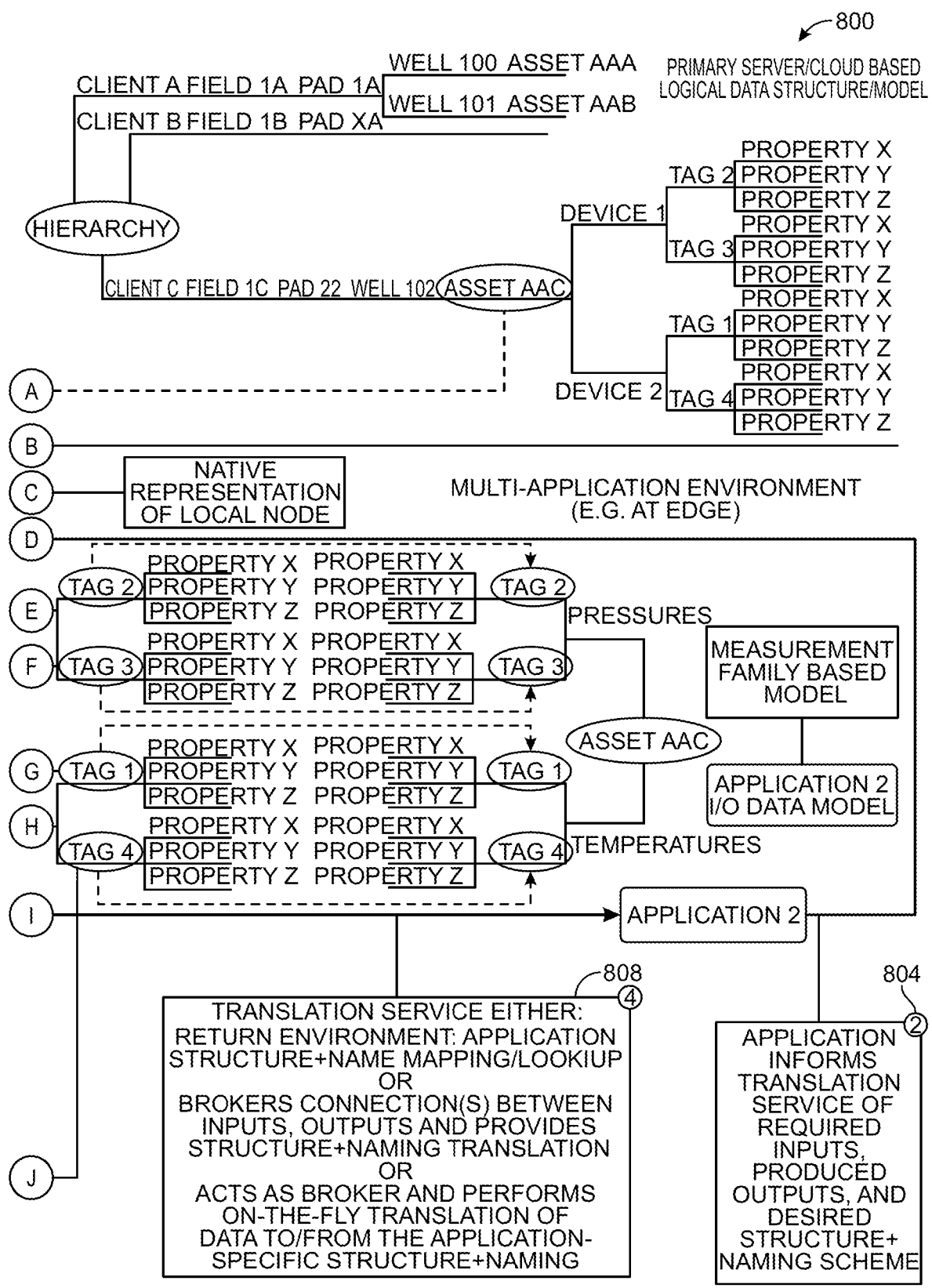
FIG. 8B is a second portion of a diagram of a high-level overview of methods for implementing control based on metadata analytics which can be part of the control system of FIG. 2, according to some embodiments.

Process 700 is shown to include using prior knowledge of register contents to automatically infer characteristics of metadata (step 712). As described herein, processor register (e.g., register) may be a quickly accessible location available to a computer's processors. Registers may consist of a small amount of fast storage, although some registers have specific hardware functions, and may be read-only or write-only. In some embodiments, application 206 receives information relating to a register (e.g., storage in edge device 204, storage in field controller 210, other storage within system 200, etc.). The characteristics of metadata may include engineering units, scaling, limits, ordinals, associations, relationships, resolutions, accuracies, magnitudes, identity, or any combination thereof Referring now to FIGS. 8A-B, a diagram 800 of a high-level overview of methods for implementing control based on metadata analytics is shown, according to exemplary embodiments. Diagram 800 is shown to include various steps, including step 802, step 804, step 806, and step 808. Diagram 800 is shown to include a primary server/cloud application I/O ontology registry and primary server/cloud based logical data structure/model. In some embodiments, the primary server (e.g., cloud application I/O ontology registry) includes a collection of naming and descriptor schemes for inputs and outputs all applications require/produce. In some embodiments, the application ontology is provided to a graph-based model (data structure) translation service.

In some embodiments, the graph-based model translation service also receives the data disclosed in step 802. Step 802 states, "Service keeps synchronized data structure/model and exposes relevant levels to environment. Service keeps synchronized version of all relevant ontologies/data dictionaries/data models." In some embodiments, the various processes disclosed in step 802 are performed at edge device 204.

In some embodiments, steps 804, step 806, and step 808 are performed at cloud computing system 202, as opposed to edge device 204. Step 804 states, "Application informs translation service of required inputs, produced outputs, and desired structure and naming schemes." Step 806 states, "Names, properties, and parent, and application ontology are used to perform translations between application specific data models. Step 808 states, "Translation service either: returns environment: application structure and name mapping/lookup." In some embodiments, step 808 includes "OR brokers connection(s) between inputs, outputs, and provides structure and naming translation." In some embodiments, step 808 includes, "OR acts as broker and performs on the fly translation of data to/from the application-specific structure and naming."

As described herein, any reference to control system 200 may also refer to any combination of any of the other systems disclosed herein, including system 100 and system 300. As disclosed herein, any reference to application 206 and the various processes performed thereby may be performed by any other processing device disclosed herein individually or in combination with multiple processing devices.

As described herein, a hydrocarbon site device may refer to any type of physical (e.g., sensor, actuator, etc.) or virtual (e.g., virtual sensor, machine learning algorithm, etc.) device configured to obtain and/or data at a hydrocarbon site. Of course, the hydrocarbon site devices may also be implemented in other systems (e.g., HVAC systems, oil refinery systems, etc.) and the implantation within a hydrocarbon site should not be considered limiting.

CONFIGURATION OF EXEMPLARY EMBODIMENTS

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software embodiments of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A control system for aggregating metadata at hydrocarbon site, the control system comprising one or more edge devices, wherein at least one of the one or more edge devices comprises a processing circuit configured to:
   receive sensor data from a plurality of sensors, each of the plurality of sensors having a first sensor type, wherein:
      a first set of the sensor data from a first sensor of the plurality of sensors has a first format, the first set of the sensor data corresponding to a first measured parameter, and
      a second set of the sensor data from a second sensor of the plurality of sensors has a second format, the second set of the sensor data corresponding to the first measured parameter;
   integrate the received sensor data into a set of metadata, the set of metadata comprising stored operational data of the hydrocarbon site;
   aggregate the set of metadata according to one or more criteria, the one or more criteria configured to categorize the received sensor data, wherein aggregating the set of metadata is performed by the one or more edge devices and comprises:
      converting the sensor data into a standardized format by converting at least the first set of sensor data and the second set of sensor data from the first format and the second format into the standardized format;
      determining a type of data for the sensor data based on the standardized format, such that the metadata is categorized according to the standardized format;
      creating at least one of a dictionary or lexicon configured to determine relationships within the set of metadata; and
      mapping disparate representations using the at least one of the created dictionary or created lexicon such that a first portion of the metadata is mapped to the first sensor type, the first portion of the metadata corresponding to a first characteristic of the sensor data; and
   adjust operation of the one or more edge devices based on the aggregated set of metadata, such that the one or more edge devices are configured to:
      receive additional sensor data from an additional sensor, the additional sensor data associated with additional metadata;
      automatically inferring a second characteristic of the additional sensor data based on retrieving, from a register of the at least one of the one or more edge devices, a contents of the register that correspond to the second characteristic; and
      automatically determine that a sensor type of the additional sensor is the first sensor type based on comparing the additional metadata to the first portion of the metadata and comparing the first characteristic to the second characteristic.

2. The control system of claim 1, wherein the processing circuit is further configured to:
   identify one or more connected devices based on the aggregated set of metadata and the one or more criteria; and
   adjust the operation of the one or more edge devices based on the aggregated set of metadata and a set of information received from at least one of the one or more connected devices.

3. The control system of claim 1, wherein:
   integrated sensor data is a first subset of the metadata and operational data is a second subset of the metadata; and
   aggregating the set of metadata according to the one or more criteria comprises:
      determining relationships between the first subset of the metadata and the second subset of the metadata; and
      mapping at least part of the first subset of the metadata to at least part of the second subset of the metadata.

4. The control system of claim 3, wherein the at least one of the created dictionary or created lexicon comprises categories that combine the criteria into one or more of the categories.

5. The control system of claim 1, wherein receiving sensor data from the plurality of sensors comprises receiving data from at least one of a field controllers or a hydrocarbon site device.

6. The control system of claim 1, wherein aggregating the set of metadata according to the one or more criteria comprises using heuristics and a prior information of register contents to automatically infer one or more characteristics of the set of metadata.

7. The control system of claim 1, wherein the processing circuit is further configured to perform an automatic scan to detect one or more connected devices or one or more criteria or a combination of the one or more connected devices and the one or more criteria.

8. The control system of claim 1, wherein aggregating the set of metadata according to the one or more criteria comprises using heuristics and a prior information of register contents to automatically infer one or more characteristics of the set of metadata, and wherein the processing circuit is further configured to perform an automatic scan to detect one or more connected devices or one on or more criteria or a combination of the one or more connected devices and the one or more criteria.

9. A computer readable media for aggregating metadata at hydrocarbon site comprising a processing circuit comprising one or more processors and memory storing instructions that, when executed by the one or more processors, causes the one or more processors to perform operations comprising:
   receiving sensor data from a plurality of sensors, each of the plurality of sensors having a first sensor type, wherein:

a first set of the sensor data from a first sensor of the plurality of sensors has a first format, the first set of the sensor data corresponding to a first measured parameter, and a second set of the sensor data from a second sensor of the plurality of sensors has a second format, the second set of the sensor data corresponding to the first measured parameter;

integrating the received sensor data into a set of metadata, the set of metadata comprising stored operational data of the hydrocarbon site;

aggregating the set of metadata according to one or more criteria, the one or more criteria configured to categorize the received sensor data, wherein aggregating the set of metadata is performed by one or more edge devices and comprises:

converting the sensor data into a standardized format by converting at least the first set of sensor data and the second set of sensor data from the first format and the second format into the standardized format;

determining a type of data for the sensor data based on the standardized format, such that the metadata is categorized according to the standardized format;

creating at least one of a dictionary or lexicon configured to determine relationships within the set of metadata;

mapping disparate representations using the at least one of the created dictionary or created lexicon such that a first portion of the metadata is mapped to the first sensor type, the first portion of the metadata corresponding to a first characteristic of the sensor data;

identifying one or more connected devices based on the aggregated set of metadata and the one or more criteria; and adjusting operation of one or more edge devices based on the aggregated set of metadata, such that the one or more edge devices are configured to:

receive additional data from one or more connected devices, the additional data associated with additional metadata;

automatically inferring a second characteristic of the additional data based on retrieving, from a register of the at least one of the one or more edge devices, a contents of the register that correspond to the second characteristic; and automatically determining that a type of the one or more connected devices is the first sensor type based on comparing the additional metadata to the first portion of the metadata and comparing the first characteristic to the second characteristic.

10. The media of claim 9, wherein:

integrated sensor data is a first subset of the metadata and operational data is a second subset of the metadata; and aggregating the set of metadata according to the one or more criteria comprises:

determining relationships between the first subset of the metadata and the second subset of the metadata; and mapping at least part of the first subset of the metadata to at least part of the second subset of the metadata.

11. The media of claim 10, wherein the at least one of the created dictionary or created lexicon comprises categories that combine the criteria into one or more of the categories.

12. The media of claim 9, wherein receiving sensor data from the plurality of sensors comprises receiving data from at least one of a field controllers or a hydrocarbon site device.

13. The media of claim 9, wherein aggregating the set of metadata according to the one or more criteria comprises using heuristics and a prior information of register contents to automatically infer characteristics of the set of metadata.

14. The media of claim 9, wherein the processing circuit is further configured to perform an automatic scan to detect the one or more connected devices or one on or more criteria or a combination of the one or more connected devices and the one or more criteria.

15. The media of claim 9, wherein integrated sensor data is a first subset of the metadata and operational data is a second subset of the metadata.

16. A method for aggregating metadata at hydrocarbon site, the method comprising:

receiving sensor data from a plurality of sensors, each of the plurality of sensors having a first sensor type, wherein:

a first set of the sensor data from a first sensor of the plurality of sensors has a first format, the first set of the sensor data corresponding to a first measured parameter, and a second set of the sensor data from a second sensor of the plurality of sensors has a second format, the second set of the sensor data corresponding to the first measured parameter;

integrating the received sensor data into a set of metadata, the set of metadata comprising stored operational data of the hydrocarbon site;

aggregating the set of metadata according to one or more criteria, the one or more criteria configured to categorize the received sensor data, wherein aggregating the set of metadata is performed by the one or more edge devices and comprises:

converting the sensor data into a standardized format by converting at least the first set of sensor data and the second set of sensor data from the first format and the second format into the standardized format;

determining a type of data for the sensor data based on the standardized format, such that the metadata is categorized according to the standardized format;

creating at least one of a dictionary or lexicon configured to determine relationships within the set of metadata; and mapping disparate representations using the at least one of the created dictionary or created lexicon such that a first portion of the metadata is mapped to the first sensor type, the first portion of the metadata corresponding to a first characteristic of the sensor data;

identifying one or more connected devices based on the aggregated set of metadata and the one or more criteria; and adjusting operation of one or more edge devices based on the aggregated set of metadata, such that the one or more edge devices are configured to:

receive additional data from one or more connected devices, the additional data associated with additional metadata;

automatically inferring a second characteristic of the additional data based on retrieving, from a register of the at least one of the one or more edge devices, a contents of the register that correspond to the second characteristic; and automatically determine that a type of an additional sensor is the first sensor type based on comparing the additional metadata to the first portion of the metadata and comparing the first characteristic to the second characteristic.

17. The method of claim 16, wherein:
integrated sensor data is a first subset of the metadata and operational data is a second subset of the metadata; and
aggregating the set of metadata according to the one or more criteria comprises:
   determining relationships between the first subset of the metadata and the second subset of the metadata; and
   mapping at least part of the first subset of the metadata to at least part of the second subset of the metadata.

18. The method of claim 17, wherein the at least one of the created dictionary or created lexicon comprises categories that combine the criteria into one or more of the categories.

19. The method of claim 16, wherein receiving sensor data from the plurality of sensors comprises receiving data from at least one of a field controllers or a hydrocarbon site device.

20. The method of claim 17, wherein the at least one of the created dictionary or created lexicon comprises categories that combine the criteria into one or more of the categories, and wherein receiving sensor data from the plurality of sensors comprises receiving data from at least one of a field controllers or a hydrocarbon site device.

* * * * *